United States Patent [19]

Kubota et al.

[11] Patent Number: 4,806,364

[45] Date of Patent: Feb. 21, 1989

[54] METHOD OF MAKING CHEWING GUM

[75] Inventors: Robin M. Kubota, Woodridge; Sharon M. Thomas, Chicago; Albert H. Chapdelaine, Naperville; Steven B. Courtright, Evanston, all of Ill.

[73] Assignee: Wm. Wrigley Jr. Company, Chicago, Ill.

[21] Appl. No.: 41,030

[22] Filed: Apr. 22, 1987

[51] Int. Cl.⁴ .............................................. A23G 3/30
[52] U.S. Cl. .......................................................... 426/5
[58] Field of Search ........................................ 426/3, 5

[56] References Cited

U.S. PATENT DOCUMENTS

| | | | |
|---|---|---|---|
| 2,460,698 | 2/1949 | Lindhe | 99/135 |
| 3,262,784 | 7/1966 | Bucher | 426/5 |
| 3,857,965 | 12/1974 | Ream | 426/3 |
| 4,000,321 | 12/1976 | Mochizuki | 426/3 |
| 4,370,350 | 1/1983 | Fisher | 426/5 |
| 4,514,422 | 4/1985 | Yang et al. | 426/3 |
| 4,588,592 | 5/1986 | Elias | 426/5 |

*Primary Examiner*—Jeanette Hunter
*Attorney, Agent, or Firm*—Willian Brinks Olds Hofer Gilson & Lione Ltd.

[57] ABSTRACT

A method of making chewing gum is disclosed which reduces the incidence of "sugar spots." The method begins by providing a sweetener matrix in a mixer. Discrete particles of unmelted gum base, e.g. commercially available gum base pellets, are then added to the mixer. These two components are mixed until a homogenous mass is produced. Preferably, the sweetener matrix contains no more than about 13 percent by weight moisture at the time the gum base particles are added.

26 Claims, 1 Drawing Sheet

METHOD OF MAKING CHEWING GUM

BACKGROUND OF THE INVENTION

The present invention relates to methods of making chewing gum. More particularly, the invention relates to a method of making chewing gum wherein discrete particles of gum base are added to a pre-existing sweetener matrix.

In conventional methods of making chewing gum, the gum base is typically added to the mixer first whereupon it is heated and mixed. Normally, only after the gum base has been converted to a molten, flowing mass, are the other ingredients, such as sugar, bulking agents, etc., added to complete the chewing gum formulation. The mixing of this combination of chewing gum components then continues until they become well blended within each other and a homogenous mass is produced.

One disadvantage of adding the sugar and other powdered ingredients to the molten gum base in the mixer is the fact that portions of the sugar can become compacted against the bottom or sides of the mixing chamber before being blended with the base. As the mixing continues, these layers of sugar and the like on the bottom or sides of the mixing chamber become more and more compacted by the mechanical action of the mixer. Often, these compacted layers will eventually break away from the bottom or sides of the chamber late in the mixing process thereby producing lumps of sugar or "sugar spots" within the chewing gum product. Likewise, lumps can also occur when making sugarless gum with a sugar alcohol bulking agent.

SUMMARY OF THE INVENTION

The present invention is directed to a method of making chewing gum including the following steps. First, a sweetener matrix is provided in a mixing means. This sweetener matrix includes a powdered sweetener, either natural or artificial, and preferably no more than 13 percent by weight moisture from all sources. Next, a quantity of discrete particles of unmelted gum base, such as gum base pellets, is added to the sweetener matrix in the mixing means. These two components are then mixed until the discrete particles of gum base are blended into a homogenous mass with the sweetener matrix.

The present invention differs from conventional chewing gum making techniques in that, instead of adding the sweetener and other ingredients to a molten mass of gum base already in the mixer, the sweetener and other ingredients which make up the sweetener matrix are added to the mixer first and mixed if necessary, whereupon the gum base, in the form of unmelted discrete particles, is added to the mixer. In other words, the gum base is added to a pre-existing sweetener matrix and is added in the form of unmelted particles.

This variation from the conventional practice has proven advantageous inasmuch as it effectively alleviates the problems of "sugar spots." That is, when the gum base particles are added to the sweetener matrix, as opposed the sweetener matrix being added to the gum base, and when the gum base is added in the form of discrete particles, as opposed to a molten, flowing mass, the method of mixing the components of a chewing gum formulation proceeds without the formation of compacted layers of sugar and resultant sugar lumps inherent in conventional mixing techniques.

A further advantage of the present invention is that it can be practiced using the same equipment as used for conventional methods. In particular, the mixing means used in the preferred embodiment of the present invention can be identical to those used in conventional methods and no additional equipment is needed.

The term "moisture" as used in this specification and the claims appended hereto, is intended to refer to all liquids present in the sweetener matrix, such as water, glycerin, vegetable oil, etc.

Also, it should be noted that, unless otherwise specified, all percentages stated in the specification and claims are intended to refer to percentages by weight.

DETAILED DESCRIPTION OF THE PREFERRED EMBODIMENTS

Figures 1, 2:
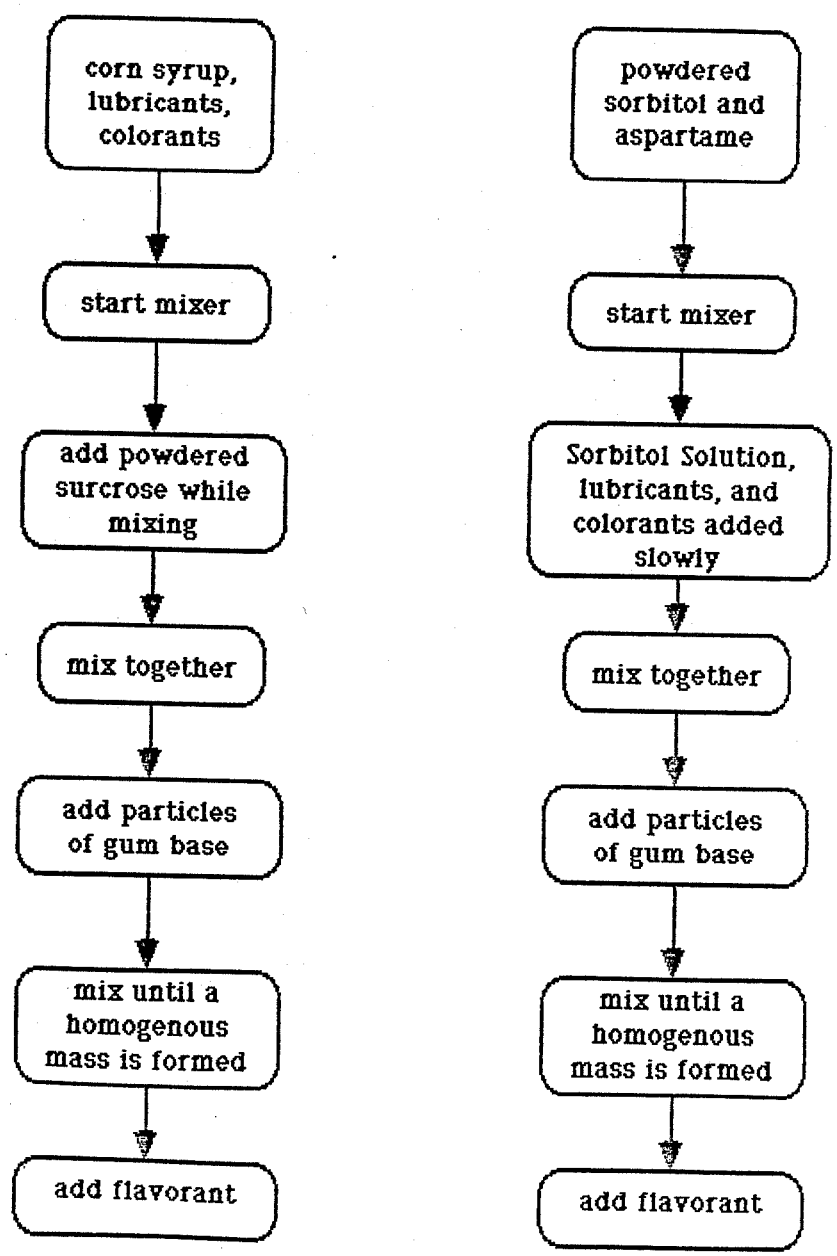
FIG. 1 is a block diagram illustrating a preferred method of the present invention.
FIG. 2 is a block diagram illustrating an alternatively preferred method of the present invention.

In the following description, the preferred embodiment for making a sugar-containing gum will be described first in connection with FIG. 1. Following this, the preferred embodiment for making a sugarless gum will be described in connection with FIG. 2.

As see in FIG. 1, the preferred method of the present invention for making a sugar-containing gum begins by adding a quantity of corn syrup to a mixer. The mixer is activated and the sugar is added gradually while mixing.

The mixer used in the method of this invention can be that type which is standard in the industry. In particular, the mixer will typically have a sigma or other type blade. The mixer will typically also be capable of heating the mixing chamber by a jacket or other means.

The corn syrup used in this embodiment is preferably a relatively high solids corn syrup. Most preferably, the corn syrup used includes about 20 percent water. The corn syrup can contain more water than this. However, for reasons to be explained below, it is preferable that the corn syrup contribute no more moisture that that which would make the total moisture content of the sweetener matrix be above thirteen percent.

The sugar used in this embodiment is in a powdered form and is preferably powdered sucrose. Most preferably, the sucrose has a particle size such that between 2 and 7 percent are retained on a U.S. Standard Sieve No. 35, and between 92 and 97 percent are retained on a U.S. Standard Sieve No. 100. Alternatively, powdered dextrose, fructose, corn syrup solids, and combinations thereof can also be employed.

In addition to a sweetener, the sweetener matrix also preferably contains a plasticizer to enhance the consistency of the final gum product. Most preferably, the plasticizer is glycerin. Alternatively, other compounds can be used singly or in combination as plasticizers. Examples of other plasticizers are glycerol monostearate, acetylated monoglycerides, lecithin, vegetable oils, and the like.

Depending on the desired characteristics of the gum product to be made, other ingredients may also be included in the sweetener matrix. For example, an inert filler material, such as calcium carbonate or talc may be included in the matrix. Colorants can also be added at this point. Although flavorants can be added at this point, it is generally preferred to add flavorants later in the mixing schedule, i.e. after the gum base has been thoroughly blended, due to the fact that most flavorants are relatively volatile.

The relative proportions of ingredients in the sweetener matrix can be varied greatly. In making a sugar-containing gum, the powdered sucrose can be between about 20 and about 100 percent, the corn syrup can be between about 0 and about 55 percent, and the glycerin can be between about 0 and about 25 percent of the sweetener matrix. Preferably, the powdered sucrose is between about 50 and about 85 percent, the corn syrup is between about 15 and about 35 percent, and the glycerin is between about 0 and about 10 percent of the sweetener matrix. Most preferably, the powdered sucrose is about 73 percent, the corn syrup is about 26 percent, and the glycerin is about 1 percent. In addition, in this most preferred embodiment of making a sugar-containing gum, the sweetener matrix also comprises about 0.45 percent lecithin, and about 0.50 percent color.

As mentioned above, it is preferred that the moisture content of the sweetener matrix be no more than about 13 percent up until the time the particles of gum base are added. This moisture can be present in the sweetener matrix from direct addition of liquids such as water, or the plasticizers described above. Moisture may also be present in the sweetener matrix as a result of the water or other liquid present in another of the ingredients such as the corn syrup, or sugar alcohol solution.

This 13 weight percent moisture limit has been observed to be preferred in the practice of the present invention. Although not completely understood, and not wishing to be bound by any particular theory, it is currently believed that the method of the present invention works by the following mechanism. As the discrete particles of gum base are added to the sweetener matrix, each particle become surrounded by the matrix material. The mechanical forces of the mixer, i.e. compressive and shear, have the effect of softening the particles of gum base. In addition to the mechanical forces, heat can also be added to the mixer to facilitate the softening process. As the particles soften, the mechanical forces of the mixer, also act to push the sweetener matrix material into the particles of gum base. This process continues until the particles of gum base are completely blended into the sweetener matrix and a homogenous mass is formed.

It has been observed that, if the moisture content of the sweetener matrix is above about 13 percent, the process is adversely affected. The reason for this is believed to be that the higher moisture content lowers the viscosity of the sweetener matrix and thereby reduces the mechanical forces to which the gum base particles are subjected. That is, the gum base particles are more likely to "float" through the matrix instead of being softened by the compressive and shear forces of the mixer. In other words, if the viscosity of the sweetener matrix is too low, the gum base particles and the matrix are more likely to get out of each other's way rather than becoming interspersed. It has been observed that moisture levels above about 13 percent produce this undesirably low viscosity. As noted above, this explanation is only a theory at present.

The most preferred method of combining the ingredients of the sweetener matrix is as follows. First, the corn syrup, glycerin, lecithin, and color are added to the mixing chamber. The mixer is then activated and the sugar is poured in gradually while the mixer is going.

The sweetener matrix is most preferably mixed for about 8 minutes.

During mixing, it is preferred that the mixing chamber be heated to about 120° F. However, as demonstrated by Example 6 below, it is not necessary to add this heat. In other words, the mechanical forces of the mixer are sufficient to effect the softening and blending required in this method. In fact, it was observed that the time to obtain a homogenous blend was lower when the mixer was not heated than when it was. Thus, in some embodiments it may be preferred to not add heat. However, without the added heat, there was a higher power demand on the mixing motor.

After the sweetener matrix is mixed, a quantity of discrete particles of gum base is added to the mixer all at once. As stated above, adding particles of gum base to the sweetener matrix is the reverse order of conventional practice. However, this reversal of the order has been found to be advantageous in reducing the occurrence of sugar spots in gum manufacture.

The discrete particles of gum base used in the two preferred embodiments described herein comes in the form of pellets, i.e. spheres which are between about 5 to about 15 mm in diameter. Although this form is generally available and preferred by some gum manufacturers because of the ease at which the pellets can be handled, it is believed that gum base pellets have only been used in conventional gum making methods. That is, it is believed that the gum base pellets have to date been heated and mixed in the mixer to produce a molten, flowing mass of gum base before the other ingredients of the chewing gum are added.

The gum base used in the most preferred embodiment is a conventional bubble gum base comprising polyvinyl acetate and polyisolbutylene. The bubble gum base used in the most preferred embodiment has a softening point of about 56° C. In addition, this bubble gum base has a cone and plate shear rate viscosity measured by ASTM E-28-58T at 88.9° C. and 38.4 rev./sec. of $8,996 \pm 1,346$ centipoise and at 88.9° C. and 96 rev./sec. of $7,585 \pm 826$ centipoise.

The present invention is also useful in making a stick type gum (See Examples 2, 7, and 8 below). Thus, in accordance with an alternatively preferred embodiment of making a sugar-containing gum, the particles of gum base employed are those which can be obtained from the L.A. Dreyfus Company under the designation "Firm Modifier" which is a commercially available gum base primarily sold for stick gum products. This particular gum base is a blend of natural and synthetic ingredients.

Alternatively, other gum base products can be used so long as they are available as particles, i.e. pellets.

Preferably, the gum base is present in the final gum product between about 15 and about 50 percent, and most preferably about 22 percent.

After the gum base particles are added to the sweetener matrix, the ingredients are mixed for a time sufficient to produce a homogenous mass. Typically, the mixing will continue for about 10 to about 20 minutes after the gum base particles are added, most preferably about 19 minutes. It is considered to be within the skill in the art to determine the appropriate time of mixing depending on whether heat is added to the mixer, the type of mixer used, the size of the batch, etc.

Preferably, a flavorant, such as an essential oil to produce a mint, cinnamon, or a fruit flavor, is added to the homogenous mass and mixed for a time sufficient to ensure complete dispersion within the product.

At this point, the homogenous mass produced can be shaped and formed by conventional techniques to produce individual pieces of bubble gum or chewing gum, as the case may be.

Referring to FIG. 2, the preferred method for making a sugarless gum according to the present invention will be described. A quantity of powdered sorbitol and a quantity of a high potency sweetener are placed in the mixing chamber of a conventional mixer. The sorbitol is standard food grade sorbitol such as that available from Pfizer Chemical Co. under the designation "Coarse Sorbitol Powder." Alternatively, other sugar alcohols may be used, such as mannitol, xylitol, maltitol, or palatinit. As is known in the art, the sorbitol or other sugar alcohol functions as a sweet bulking agent.

Preferably, the high-potency sweetener used in this embodiment is the dipeptide sweetener L-aspartic acid ester of L-phenylalanine, generally known as aspartame. Most preferably, the aspartame used is obtained from the G. D. Searle Company under their designation "Nutrasweet ®." Alternatively, the high-potency sweetener is 6-methyl-1.2.3-oxathiazin-4(3H)-one-2.2-dioxide, generally known as acesulfame K or L-aspartyl-D-alanine 2,2,4,4 tetramethyl-thienyl-amide, generally known as alitame. In still other alternative embodiments, the sweetener is selected from the group consisting of sacharine and its salts, cyclamic acid and its salts, dihydrochalcones, thaumatin, and monellin, as well as combinations thereof.

The mixer is then activated and and a quantity of a 70/30 percent sorbitol solution in water is slowly added to the mixer. A plasticizer is also preferably added to this point. As with making the sugar-containing gum, the plasticizer is most preferably glycerin, although others such as those mentioned above can also be used. Colorants are also added at this point.

Proportions of the ingredients for the sweetener matrix are as follows: between about 30 and about 100 percent sugar alcohol; between about 0 and about 10 percent plasticizer; and between about 0 and about 13 percent water from the sugar alcohol solution. Preferably, the proportions are: between about 50 and about 90 percent sugar alcohol, between about 0 and about 5 percent plasticizer; and between about 0 and about 10 percent water from the sugar alcohol solution.

This sugarless sweetener matrix is then mixed for a time sufficient to cause a complete blending.

The gum base particles are then added to the matrix in the amount and by the method described above with the sugar-containing gum. Mixing is continued until a homogenous mass is formed. A flavorant is then added and completely mixed with the remaining ingredients.

EXAMPLES

The following examples are provided by way of explanation and illustration and are not to be interpreted as limiting the scope of the present invention as defined in the appended claims.

Example 1 was carried out to make a sugar-containing bubble gum. First, 2300 g. of corn syrup with about 19% water obtained from the A. E. Staley Co. was added to the mixing chamber of a laboratory scale sigma type mixer, i.e. 2 gallon capacity. During mixing, the mixing chamber was heated by a hot water jacket to about 120° F. About 57 g. of glycerin and were added to this corn syrup. The mixer was activated and 2115 g. of powdered sucrose was added while mixing. After 8 minutes of mixing the sweetener matrix, the mixer was stopped and 1260 g. of bubble gum base pellets (the bubble gum base pellets referred to above) were added. Mixing was then continued for another 12 minutes. The resultant gum product was homogenous, although it appeared to be too soft to be a good bubble gum product.

The proportions of ingredients in this Example are set out below:

|  | Grams | % Of Total | % Of Matrix | % Moisture In Matrix |
| --- | --- | --- | --- | --- |
| Sucrose | 2115 | 36.9 | 47.3 |  |
| Corn Syrup | 2300 | 40.13 | 51.4 | 10.3 |
| Glycerin | 57 | 0.99 | 1.3 | 1.3 |
| Bubblegum Base | 1260 | 21.98 |  |  |
|  |  | total % moisture in matrix |  | 11.6 |

Example 2 was carried out the same as Example 1 except that the proportions of the ingredients were changed and a stick type gum base (i.e. the "Firm Modifier" gum base referred to above) was used in the place of the bubble gum base used in Example 1. In addition, 54 grams of citric acid were added at the start to the sweetener matrix. Also, 57 grams of a cola flavor were added after the gum base was blended into the matrix. The resultant product was a homogenous mass that appeared to have good texture and chewing characteristics. The proportions of the ingredients are set out below:

|  | Grams | % Of Total | % Of Matrix | % Moisture In Matrix |
| --- | --- | --- | --- | --- |
| Sucrose | 3345 | 56.28 | 72.3 |  |
| Corn Syrup | 1170 | 19.69 | 25.3 | 5.1 |
| Glycerin | 57 | 0.96 | 1.2 | 1.2 |
| Citric Acid | 54 | 0.91 | 1.2 |  |
| Stick Gum Base | 1260 | 21.20 |  |  |
| Flavor | 57 | 0.96 |  |  |
|  |  | total % moisture in matrix |  | 6.3 |

Example 3 was carried out the same as Example 1 except that the proportions of the ingredients were again changed as shown below:

|  | Grams | % Of Total | % Of Matrix | % Moisture In Matrix |
| --- | --- | --- | --- | --- |
| Sucrose | 2952 | 50.62 | 64.6 |  |
| Corn Syrup | 600 | 10.29 | 13.1 | 2.6 |
| Glycerin | 1020 | 17.49 | 22.3 | 22.3 |
| Bubblegum Base | 1260 | 21.6 |  |  |
|  |  | total % moisture in matrix |  | 24.9 |

As seen, the sweetener matrix in this example had about 25 percent moisture. It was observed that the gum base did not mix well with this sweetener matrix having such a high moisture content. In particular, it was observed that, although a homogenous mass did eventually form, it took longer than in the other examples and the end product was too fluid and soft to be used as chewing gum.

Example 4 was carried out the same as Example 1 except that the sweetener matrix had no moisture present in it when the particles of gum base were added. When mixed for 30 minutes, this product was fluffy in sharp contrast with the product of the other examples. The proportions are set out below:

|  | Grams | % Of Total | % Of Matrix | % Moisture In Matrix |
|---|---|---|---|---|
| Sucrose | 4629 | 77.15 | 98.8 |  |
| Citric Acid | 54 | 0.90 | 1.2 |  |
| Bubblegum Base | 1260 | 21.00 |  |  |
| Flavor | 57 | 0.95 |  |  |
| total % moisture in matrix |  |  |  | 0 |

Example 5 was carried out as an extension of Example 4. In particular, 809 g. of corn syrup were added to the fluffy product. This was mixed for about 10 minutes and a homogenous product with acceptable gum properties was produced. The resultant proportions are set forth below:

|  | Grams | % Of Total | % Of Matrix | % Moisture In Matrix |
|---|---|---|---|---|
| Sucrose | 4629 | 68.0 | 84.3 |  |
| Citric Acid | 54 | 0.8 | 1.0 |  |
| Corn Syrup | 809 | 11.9 | 14.7 | 2.9 |
| Bubblegum Base | 1260 | 18.5 |  |  |
| Flavor | 57 | 0.8 |  |  |
| total % moisture in matrix |  |  |  | 2.9 |

Example 6 was carried out the same as Example 1 except that the mixing chamber was not heated, i.e. was left at room temperature of 72° F. The gum base particles were added to the mixer after about 8 minutes of mixing the sweetener matrix. After another 4 minutes of mixing, a homogenous mass was produced. It is thus demonstrated that the mechanical forces of the mixer are sufficient to cause good blending of the gum base and the sweetener matrix. However, it has been observed that the addition of heat lowers the amount of mechanical force needed to accomplish the blending. The proportions of this product are set out below:

|  | Grams | % Of Total | % Of Matrix | % Moisture In Matrix |
|---|---|---|---|---|
| Sucrose | 3345 | 58.05 | 74.4 |  |
| Corn Syrup | 1100 | 19.09 | 25.4 | 5.0 |
| Glycerin | 57 | 0.99 | 1.3 | 1.3 |
| Bubblegum Base | 1260 | 21.87 |  |  |
| total % moisture in matrix |  |  |  | 6.3 |

Example 7 was carried out to make a sugarless gum. In particular 3400 g. of powdered sorbitol and 500 g. of a 70/30 sorbitol solution in water were added to the same mixer described above. As above, the chamber was heated to 120° F. After about 3 minutes of mixing, 1100 g. of "Firm Modifier" gum base pellets were added. Mixing continued for another 17 minutes. A homogenous sugarless gum product was produced. The proportions of the ingredients are set forth below:

|  | Grams | % Of Total | % Of Matrix | % Moisture In Matrix |
|---|---|---|---|---|
| Sorbitol | 3400 | 68.0 | 87.2 |  |
| 70/30 Soln. | 500 | 10.0 | 12.8 | 3.8 |
| Stickgum Base | 1100 | 22.0 |  |  |
| total % moisture in matrix |  |  |  | 3.8 |

Example 8 was carried out the same as Example 7 except that 300 grams of glycerin were added and a lower percentage of powdered sorbitol was added. It was observed that the gum base did not become well blended with the sweetener matrix. Thus, this level of moisture, i.e. about 14.2 percent from the glycerin and the water in the sorbitol solution, is considered to be above the preferred level discussed above. In other words, this 14.2 percent moisture level produced a sweetener matrix with a viscosity too low to provide proper blending of the matrix and the gum base. The proportions of ingredients are set forth below:

|  | Grams | % Of Total | % Of Matrix | % Moisture In Matrix |
|---|---|---|---|---|
| Sorbitol | 2900 | 54.7 | 69.0 |  |
| 70/30 Sorbitol Soln. | 1000 | 18.9 | 23.8 | 7.1 |
| Glycerin | 300 | 5.7 | 7.1 | 7.1 |
| Stickgum Base | 1100 | 20.7 |  |  |
| total % moisture in matrix |  |  |  | 14.2 |

In summary, a method has been described for making chewing gum, either sugar-containing or sugarless, which method reduces the incidence of lumps or "sugar spots." Although specific embodiments and examples have been described herein, it should be born in mind that these have been provided by way of explanation and illustration and that the present invention is not limited thereby. Certainly, modifications which are within the ordinary skill in the art to make are considered to lie within the scope of the invention as defined by the following claims, including all equivalents.

I claim:

1. A method of making chewing gum comprising the steps of:
   providing a sweetener matrix in a mixing means, said matrix comprising a powdered sweetener;
   adding to the sweetener matrix in the mixing means a quantity of discrete particles of unmelted gum base; and
   beginning the mixing of the sweetener matrix and the unmelted gum base particles and continuing to mix until the discrete particles of gum base become blended into a homogenous mass with the sweetener matrix.

2. The method of claim 1 wherein the sweetener matrix comprises no more than about 13 percent moisture.

3. The method of claim 1 wherein the sweetener matrix comprises a sweetener selected from the group consisting of sucrose, dextrose, fructose, corn syrup solids, and combinations thereof.

4. The method of claim 3 wherein the sweetener matrix further comprises a plasticizer selected from the group consisting of glycerin, glycerol monstearate, acetylated monoglycerides, lecithin, vegetable oils, and combinations thereof.

5. The method of claim 3 wherein the sweetener matrix comprises corn syrup.

6. The method of claim 5 wherein the sweetener matrix further comprises a plasticizer selected from the group consisting of glycerin, glycerol monstearate, acetylated monoglycerides, lecithin, vegetable oils, and combinations thereof.

7. The method of claim 1 wherein the sweetener matrix comprises a sugar alcohol selected from the group consisting of sorbitol, mannitol, xylitol and combinations thereof.

8. The method of claim 7 wherein the sweetener matrix comprises a high-potency sweetener selected from the group consisting of aspartame, acesulfame K, allitame, sacharine and its salts, cyclamic acid and its salts, dihydrachalcones, thaumatin, monellin, and combinations thereof.

9. The method of claim 8 wherein the sweetener matrix further comprises a plasticizer selected from the group consisting of glycerin, glycerol monstearate, acetylated monoglycerides, lecithin, vegetable oils, and combinations thereof.

10. The method of claim 1 wherein the sweetener matrix comprises sorbitol and aspartame.

11. The method of claim 10 wherein the sweetener matrix further comprises a plasticizer selected from the group consisting of glycerin, glycerol monstearate, acetylated monoglycerides, lecithin, vegetable oils, and combinations thereof.

12. The method of claim 1 wherein heat is added to the mixing means to facilitate softening of the particles of gum base.

13. The method of claim 1 wherein heat is not added to the mixing means.

14. A method of making chewing gum comprising the steps of:
providing a sweetener matrix in a mixing means, said matrix comprising sucrose, corn syrup and no more than 13 percent moisture;
mixing the sweetener matrix in the mixing means;
adding to the mixed sweetener matrix in the mixing means a quantity of discrete particles of unmelted gum base; and
beginning the mixing of said sweetener matrix and said unmelted gum base particles and continuing to mix until said discrete particles of gum base become blended into a homogenous mass with the sweetener matrix.

15. The method of claim 14 wherein the sweetener matrix further comprises a plasticizer selected from the group consisting of glycerin, glycerol monstearate, acetylated monoglycerides, lecithin, vegetable oils, and combinations thereof.

16. The method of claim 14 wherein the plasticizer is present at between about 0 and about 10 percent of the sweetener matrix.

17. The method of claim 14 wherein the sucrose is present at between about 50 and about 85 percent of the sweetener matrix.

18. The method of claim 14 wherein the corn syrup is present at between about 15 and about 35 percent of the sweetener matrix.

19. The method of claim 17 wherein the corn syrup is present at between about 15 and about 35 percent of the sweetener matrix.

20. A method of making chewing gum comprising the steps of:
providing a sweetener matrix in a mixing means, said matrix comprising a sugar alcohol and a high-potency sweetener and no more than 13 percent moisture;
mixing the sweetener matrix in the mixing means;
adding to the mixed sweetener matrix in the mixing means a quantity of discrete particles of unmelted gum base; and
beginning the mixing of said sweetener matrix and said unmelted gum base particles and continuing to mix until said discrete particles of gum base become blended into a homogenous mass with the sweetener matrix.

21. The method of claim 20 wherein the sweetener matrix further comprises a water solution of a sugar alcohol.

22. The method of claim 20 wherein the sweetener matrix further comprises a plasticizer selected from the group consisting of glycerin, glycerol monstearate, acetylated monoglycerides, lecithin, vegetable oils, and combinations thereof.

23. The method of claim 22 wherein the plasticizer is present at between about 0 and about 5 percent of the sweetener matrix.

24. The method of claim 21 wherein the sugar alcohol is present at between about 50 and about 90 percent of the sweetener matrix.

25. The method of claim 21 wherein the water from the solution of sugar alcohol is present at between about 0 and about 10 percent of the sweetener matrix.

26. The method of claim 24 wherein the water from the solution of sugar alcohol is present at between about 0 and about 10 percent of the sweetener matrix.

* * * * *